United States Patent
Diamant et al.

(10) Patent No.: US 11,283,880 B2
(45) Date of Patent: Mar. 22, 2022

(54) TERMINATION OF DATABASE CONNECTION

(71) Applicant: International Business Machines Corporation, Armonk, NY (US)

(72) Inventors: Galia Diamant, Lexington, MA (US); Richard O. Jerrell, Manchester, NH (US); Chun-Shuo Lin, Tainan (TW); Cheng-Ta Lee, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 16/384,372

(22) Filed: Apr. 15, 2019

(65) Prior Publication Data

US 2020/0329107 A1 Oct. 15, 2020

(51) Int. Cl.
| | |
|---|---|
| *H04L 29/08* | (2006.01) |
| *H04L 29/06* | (2006.01) |
| *H04L 67/143* | (2022.01) |
| *H04L 67/01* | (2022.01) |

(52) U.S. Cl.
CPC .......... *H04L 67/143* (2013.01); *H04L 67/42* (2013.01)

(58) Field of Classification Search
CPC ....... H04L 67/143; H04L 67/42; H04L 63/10; G06F 21/6236; G06F 21/78
See application file for complete search history.

(56) References Cited

U.S. PATENT DOCUMENTS

| | | | |
|---|---|---|---|
| 2005/0071643 A1* | 3/2005 | Moghe | G06F 21/552 713/182 |
| 2005/0177634 A1 | 8/2005 | Scudder et al. | |
| 2006/0074877 A1 | 4/2006 | Kuersch et al. | |
| 2006/0161585 A1* | 7/2006 | Clarke | G06F 40/197 |
| 2009/0217240 A1* | 8/2009 | Motoyama | G06F 11/0793 717/114 |
| 2014/0115686 A1* | 4/2014 | Ivanov | H04L 29/06 726/11 |
| 2019/0014088 A1* | 1/2019 | Subramaniyan | H04L 63/0281 |
| 2020/0186507 A1* | 6/2020 | Dhanabalan | H04L 63/0478 |
| 2020/0329107 A1* | 10/2020 | Diamant | H04L 63/00 |
| 2020/0344211 A1* | 10/2020 | Katz | H04L 63/0236 |

* cited by examiner

*Primary Examiner* — Muhammad Raza
(74) *Attorney, Agent, or Firm* — Troutman Pepper Hamilton Sanders LLP (57) ABSTRACT

Embodiments provide a computer implemented method in a data processing comprising a processor and a memory including instructions, which are executed by the processor to cause the processor to implement the method of terminating a connection between a database server and a database client through an enforcement point, the method including: continuously monitoring, by the enforcement point, information related to a connection to a database, and parsing one or more queries; continuously comparing, by the enforcement point, the information with a predefined plurality of rules, and checking whether there is a rule violation; if there is a rule violation, assembling, by the enforcement point, a termination packet including an error message indicative of the rule violation; sending, by the enforcement point, the termination packet to the database client; and terminating, by the enforcement point, a connection between the enforcement point and the database client.

7 Claims, 5 Drawing Sheets

TERMINATION OF DATABASE CONNECTION

TECHNICAL FIELD

The present disclosure relates generally to a system, method, and computer program product that are used to terminate a connection between a database server and a database client in case of an anomaly.

BACKGROUND

Database Protection Solution (DPS), acting as an enforcement point, monitors transactions (i.e., any operations related to database management including creating tables, inserting/selecting/updating database data, and registering users of the database) to identify suspicious behaviors, and terminates a database connection between a database server and a database client when an anomaly/violation is detected.

Generally, database connections are terminated at a data transportation layer, e.g. Transmission Control Protocol (TCP). For example, the socket or pipe can be closed, or the shared memory segment can be detached, etc. to terminate database connections. However, this termination approach results in an uncertain state on both database server side and database client side. For example, if a TCP connection is reset, it might leave the database server and database client in an idle state. Further, the termination through the data transportation layer may be detected as a communication error on the client side, which may result in a database reconnection through an application layer.

SUMMARY

Embodiments provide a computer implemented method in a data processing system comprising a processor and a memory comprising instructions, which are executed by the processor to cause the processor to implement the method of terminating a connection between a database server and a database client through an enforcement point, the method comprising: continuously monitoring, by the enforcement point, information related to a connection to a database, and parsing one or more queries; continuously comparing, by the enforcement point, the information with a predefined plurality of rules, and checking whether there is a rule violation; if there is a rule violation, assembling, by the enforcement point, a termination packet including an error message indicative of the rule violation, wherein the error message is generated based on the information; sending, by the enforcement point, the termination packet to the database client; and terminating, by the enforcement point, a connection between the enforcement point and the database client.

Embodiments further provide a computer implemented method, further comprising: terminating, by the enforcement point, a connection between the enforcement point and the database server.

Embodiments further provide a computer implemented method, further comprising: checking, by the enforcement point, a state of the database server; if the database server is waiting for an additional data packet of a query or an additional query from the database client, resetting, by the enforcement point, the database server, so that the database server is ready for a new session; and terminating, by the enforcement point, a connection between the enforcement point and the database server.

Embodiments further provide a computer implemented method, the step of resetting the database server further comprising: sending, by the enforcement point, one or more dummy payloads or predefined payloads to the database server, so as to cancel a current transaction.

Embodiments further provide a computer implemented method, wherein the information includes one or more of a type of the database, a version of a database protocol, a state of the database, metadata and content of one or more queries from the database client and one or more responses from the database server.

Embodiments further provide a computer implemented method, wherein the metadata includes a database user ID, an internet protocol address of the database client, the timing when a data packet is accessed by the database client, and a format of the data packet.

Embodiments further provide a computer implemented method, further comprising: storing the information in a session-specific storage.

Embodiments further provide a computer implemented method, wherein the termination packet further includes a header in a particular format related to a type of the database, and a specification of the database.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawing embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Embodiments of the present invention may be a system, a method, and/or a computer program product. The computer program product may include a computer readable storage medium (or media) having computer readable program instructions thereon for causing a processor to carry out aspects of the present invention.

In an embodiment, a system, method, and computer program product for terminating a connection between a database server and a database client in case of an anomaly are provided. The system, method, and computer program product can leverage a logic of an application layer to gracefully terminate a database connection, and notify the database client of the termination with an appropriate error message. The system, method, and computer program product of this disclosure can understand different database (DB) protocols (e.g., different queries, different error messages, etc.) to terminate a connection in a graceful manner.

Figure 1:
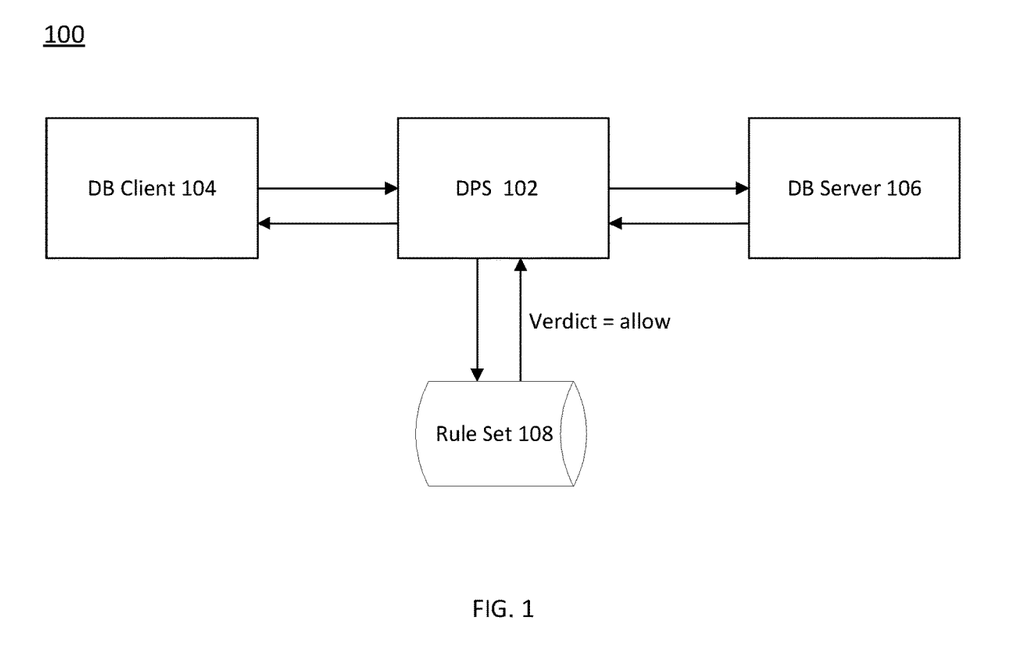
FIG. 1 depicts a block diagram of database system 100 if there is no rule violation, according to embodiments herein.

FIG. 1 depicts a block diagram of database system 100 if there is no rule violation, according to embodiments herein. As shown in FIG. 1, in an embodiment, the DPS (an enforcement point) 102 is located between the database (DB) client 104 and the database (DB) server 106, and is configured to intercept traffic data between the DB client 104 and the DB server 106. DB queries are provided from the DB client 104 to the DB server 106, and DB responses are provided from the DB server 106 to the DB client 104. The DB server 106 can be a remote server, e.g., a cloud database server maintained by a Database as a Service (DBaaS) provider. In an embodiment, the DPS can be implemented as a device. In another embodiment, the DPS can be implemented as an application in a general computer, or a mobile device including but not limited to: a mobile phone, a tablet, a laptop, and the like.

In an embodiment, the DPS 102 can include a Table Access Protocol (TAP) software agent installed on the database (DB) server 106 or/and the database (DB) client 104. In another embodiment, the DPS 102 can include a reverse proxy. The DPS 102 can maintain DB connection information, as well as a set of rules predefined in the rule set 108 defining anomalies and actions taken in response to each anomaly. The DB connection information includes metadata about the connection, e.g., IPs and ports of the DB client 104 and the DB server 106, DB users, Operating System (OS) users, an operating system, and etc. Example rules include limiting access to the DB server from specific Internet Protocol (IP) addresses, or various access controls, e.g., based on DB tables, roles, users, etc. For example, if a particular DB user or OS user connects to a particular table, then the connection will be terminated and an email will be sent to a system administrator. For another example, a connection request have to be blocked from a particular IP address. Various rules can be made by a database administrator based on the DB connection information and DB data (i.e., tables of a database). If there is no rule violation, then the DPS 102 will allow the continued connection between the DB server 106 and the DB client 104.

Figure 2:
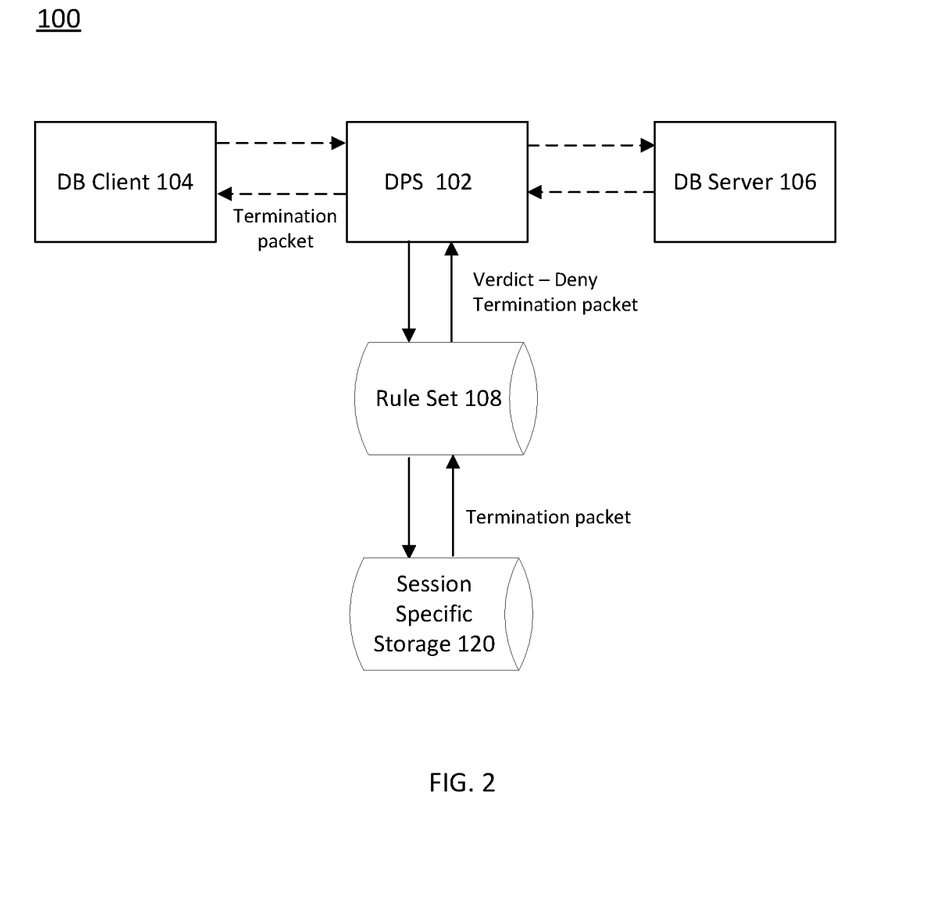
FIG. 2 depicts a block diagram of database system 100 if there is a rule violation, according to embodiments herein.

FIG. 2 depicts a block diagram of database system 100 if there is a rule violation, according to embodiments herein. A termination packet is sent to the DB client 104 or/and the DB server 106 in case of a connection termination. In an embodiment, the termination packet can be one or more network packets including an error message. In another embodiment, the termination packet includes an error message and a specification of the database which the DB client 104 is trying to access, so that the DB client 104 can understand why this session or this transaction has been terminated or banned. Thus, the DB client 104 is in a controlled state while terminating a DB session or banning a DB transaction.

In an embodiment, the following information may be collected from the current session to generate an error message. First, a type of DB (e.g., Oracle DB, or Microsoft SQL Server, etc.) and a version of the DB protocol (e.g. a version number of Tabular Data Stream protocol) is identified.

Second, the state of the DB server 106 is identified. For example, if a long query includes multiple data packets, it is possible that the first data packet is secure while the subsequent data packets are suspicious, so that the first data packet is allowed by the DPS 102 while the subsequent data packets are blocked by the DPS 102. In this case, the state of the DB server 106 shows that the DB server 106 is still waiting for additional data packets. For another example, for a particular rule stipulating that a connection will be terminated if a certain number of suspicious queries are detected in a given time interval, the state of the DB server 106 may show that the DB server 106 is still waiting for more queries to determine whether the particular rule is violated.

Third, the metadata and content of queries and responses are monitored. For example, a DB user ID, data packets that the user is accessing, timing when a data packet is accessed, a format of the data are identified. The format of data includes, e.g., a String, a Date, an Integer, a Floating point, a JSON document, etc.

Fourth, rules that a DB administrator has made are recorded and compared with the queries. A part of the above-mentioned information or all of the above-mentioned information can be stored in a local non-volatile storage or a remote storage (e.g., cloud, a remote server, etc.).

In an embodiment, a session-specific error message is provided to the database client 104 in case of a rule violation. For example, the DPS 102 can return an error message "Insufficient permissions" or "User not allowed," based on the exact scenario or condition resulting in the termination. Accordingly, the DPS 102 has a DB specific knowledge. For example, the DPS 102 can understand queries from the DB client 104 and responses from the DB server 106, and store the information related to the queries and the responses in the session specific storage 120. Specifically, the DPS 102 can parse the queries and correctly identify the grammar of the queries. For example, the query "select c from b" can be parsed, and the grammar can be identified that a verb is "select," and an object is "c." After identifying the grammar and understanding the queries, the predefined rules can be applied successfully.

In an embodiment, the DPS 102 also has knowledge of error messages supported by various databases (e.g., SQL, PostgreSQL, Oracle, DB2, etc.) and how to prepare appropriate error messages that will be provided to the DB client 104 in the context of a session. A user can understand a specific anomaly which leads to a termination when reading the error message shown on the DB client 104. Different databases may have different error messages, even for a same query. For example, Oracle can send an error message "syntax error" message in response to a bad query, while DB2 can respond with an error message "bad request." The DPS 102 prepares error messages based on queries and database types. In an embodiment, the error message will be sent to the DB client 104 in response to a query from the DB client 104. In another embodiment, the error message will be sent both to the DB client 104 and the DB server 106.

Figure 3:
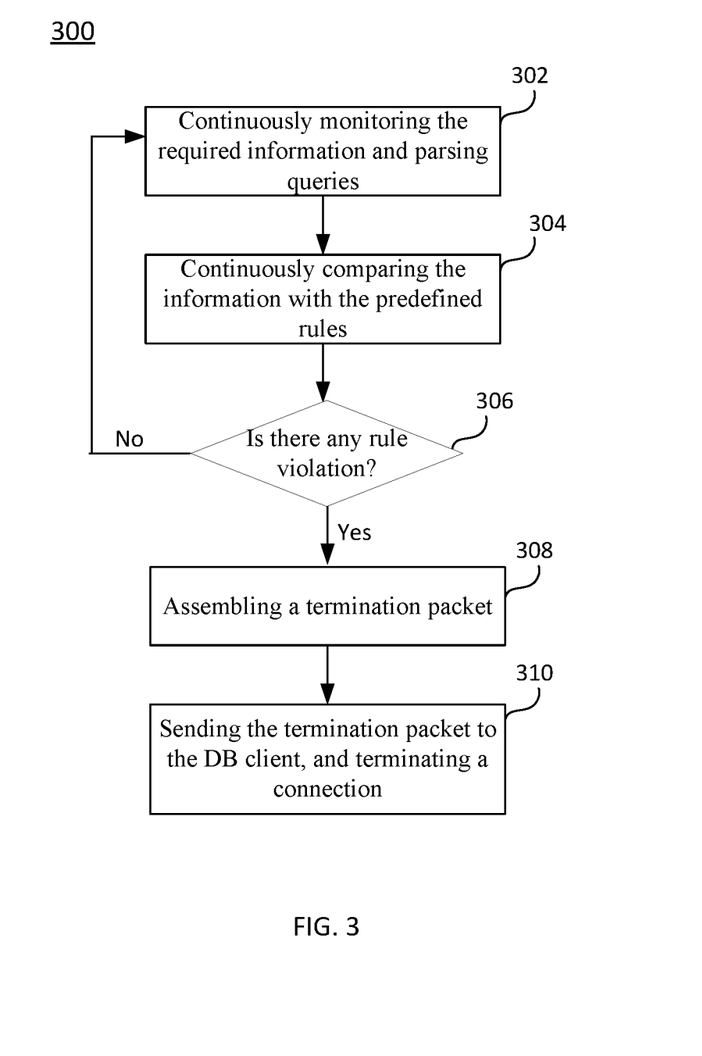
FIG. 3 depicts a flowchart illustrating a method 300 of terminating a connection between a database server and a database client, according to embodiments herein.

FIG. 3 depicts a flowchart illustrating a method 300 of terminating a connection between a database server and a database client, according to embodiments herein. As shown in FIG. 3, at step 302, when network traffic flows, continuously monitoring required information (e.g., the information collected from the current session to generate an error message) and parsing queries. In an embodiment, the required information can be stored in a session-specific storage.

At step 304, continuously comparing the required information with the predefined rules, and checking whether any rules are violated.

At step 306, if there is a rule violation that leads to a termination of the current session, then at step 308, according to a DB type and the required information, assembling a termination packet including a header in a particular format based on the type of DB, and an error message/error code. For example, a response, e.g., a login response, from the SQL database server has a predefined format, and a header of the termination packet has to conform to the predefined format, so that the DB client 104 can parse and understand the termination packet. In an embodiment, the termination packet can further include a specification of the DB, so that the user can fully understand the error message/error code in view of the specification. However, if there is no rule violation, then the method 300 goes back to the step 302, i.e., continuously monitoring the required information and parsing queries.

At step 310, the termination packet is sent to the DB client 104, then a connection between the DB client 104 and the DB server 106 is terminated. In an embodiment, a connection between the DB client 104 and the DPS 102 is terminated. In another embodiment, both a connection between the DB client 104 and the DPS 102, and a connection between the DB server 106 and the DPS 102 are terminated.

Figure 4:
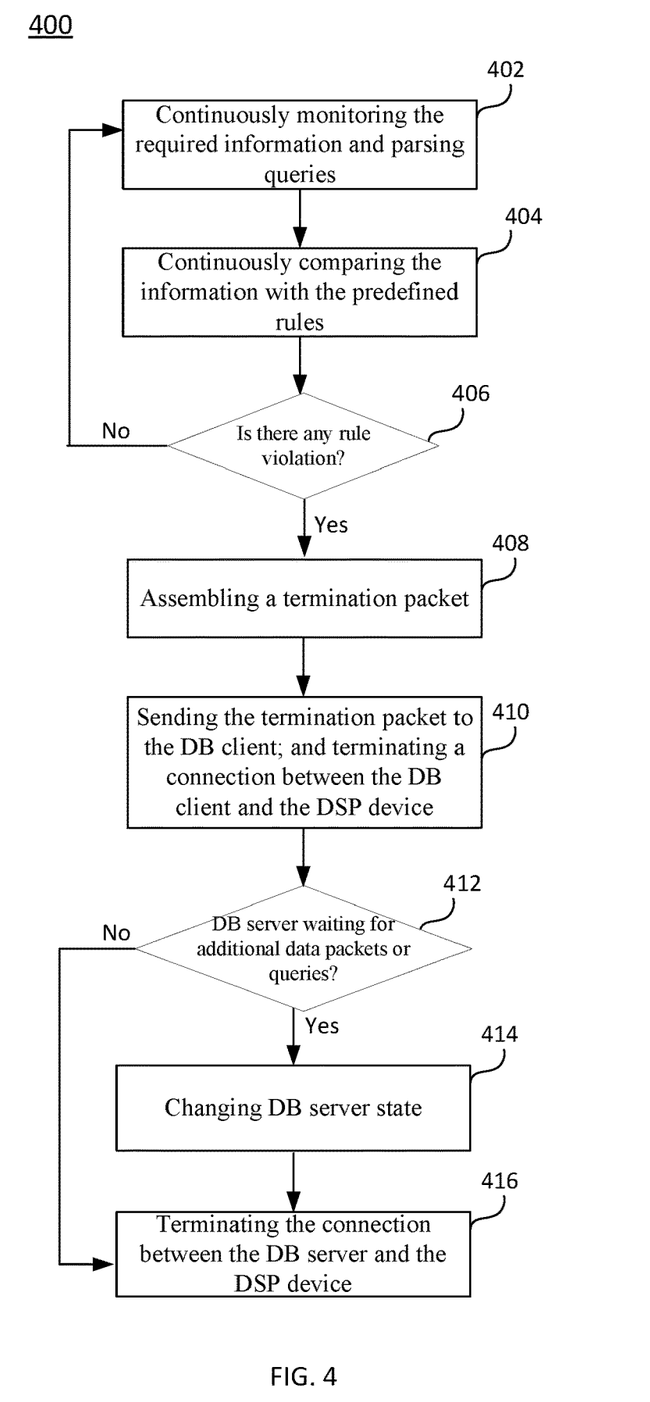
FIG. 4 depicts another flowchart illustrating a method 400 of terminating a connection between a database server and a database client, according to embodiments herein.

FIG. 4 depicts another flowchart illustrating a method 400 of terminating a connection between a database server and a database client, according to embodiments herein. The steps 402-408 are the same as the step 302-308 of FIG. 3.

At step 410, the termination packet is sent to the DB client 104, and the connection between the DB client 104 and the DPS 102 is terminated while the DB server 106 and the DPS 102 are still connected.

At step 412, checking the state of the DB server 106. If the DB server 106 is still waiting for additional data packets of a long query, or additional queries from the DB client 104, then the state of the DB server 106 can be reset so that the DB server 106 can get ready for the next DB query or transaction. For example, a long query (i.e., a long SQL statement) can be split into multiple data packets. The first data packet may be secure, while the second data packet may be malicious, and thus the second data packet has to be blocked and the connection between the DB client 104 and the DPS 102 have to be terminated. In this case, the DB server 106, however, is still waiting for the second data packet. Accordingly, at step 414, the state of the DB server 106 is changed gracefully, so that the DB server 106 can get ready for the next DB query or transaction. In an embodiment, one or more dummy payloads or predefined payloads can be sent to the DB server 106 to cancel the current query. In another embodiment, the DB server 106 is notified that the current query is an invalid query.

If the state of the DB server 106 is normal, i.e., the DB server 106 is ready for the next query or transaction, then the step 414 is not required. Accordingly, at step 416, the connection between the DPS 102 and the DB server 106 can be optionally terminated.

Figure 5:
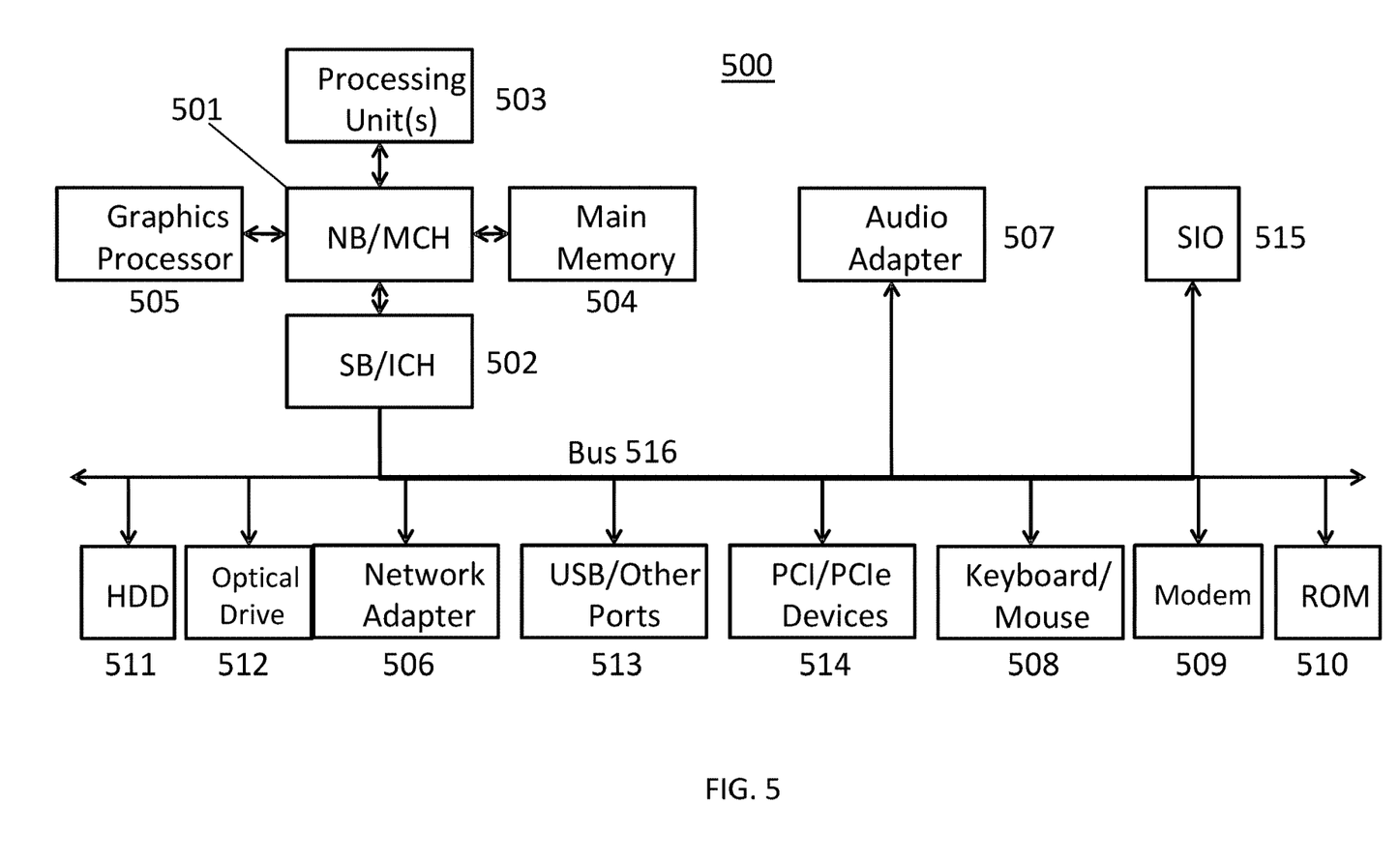
FIG. 5 is a block diagram of an example data processing system 500 in which aspects of the illustrative embodiments may be implemented.

FIG. 5 is a block diagram of an example data processing system 500 in which aspects of the illustrative embodiments may be implemented. The data processing system 500 is an example of a computer, such as a server or client, in which computer usable code or instructions implementing the process for illustrative embodiments of the present invention are located. In one embodiment, FIG. 5 may represent the DB server 106 or the DB client 104.

In the depicted example, data processing system 500 may employ a hub architecture including a north bridge and memory controller hub (NB/MCH) 501 and south bridge and input/output (I/O) controller hub (SB/ICH) 502. Processing unit 503, main memory 504, and graphics processor 505 may be connected to the NB/MCH 501. Graphics processor 505 may be connected to the NB/MCH 501 through an accelerated graphics port (AGP) (not shown in FIG. 5).

In the depicted example, the network adapter 506 connects to the SB/ICH 502. The audio adapter 507, keyboard and mouse adapter 508, modem 509, read only memory (ROM) 510, hard disk drive (HDD) 511, optical drive (CD or DVD) 512, universal serial bus (USB) ports and other communication ports 513, and the PCI/PCIe devices 514 may connect to the SB/ICH 502 through bus system 516. PCI/PCIe devices 514 may include Ethernet adapters, add-in cards, and PC cards for notebook computers. ROM 510 may be, for example, a flash basic input/output system (BIOS). The HDD 511 and optical drive 512 may use an integrated drive electronics (IDE) or serial advanced technology attachment (SATA) interface. The super I/O (SIO) device 515 may be connected to the SB/ICH 502.

An operating system may run on processing unit 503. The operating system could coordinate and provide control of various components within the data processing system 500. As a client, the operating system may be a commercially available operating system. An object-oriented programming system, such as the Java™ programming system, may run in conjunction with the operating system and provide calls to the operating system from the object-oriented programs or applications executing on data processing system 500. As a server, the data processing system 500 may be an IBM® eServer™ System P® running the Advanced Interactive Executive operating system or the Linux operating system. The data processing system 500 may be a symmetric multiprocessor (SMP) system that may include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments of the generation system may be performed by the processing unit 503 using computer usable program code, which may be located in a memory such as, for example, main memory 504, ROM 510, or in one or more peripheral devices.

A bus system 516 may be comprised of one or more busses. The bus system 516 may be implemented using any type of communication fabric or architecture that may provide for a transfer of data between different components or devices attached to the fabric or architecture. A communication unit such as the modem 509 or network adapter 506 may include one or more devices that may be used to transmit and receive data.

Those of ordinary skill in the art will appreciate that the hardware depicted in FIG. 5 may vary depending on the implementation. Other internal hardware or peripheral devices, such as flash memory, equivalent non-volatile memory, or optical disk drives may be used in addition to or in place of the hardware depicted. Moreover, the data processing system 500 may take the form of a number of different data processing systems, including but not limited to, client computing devices, server computing devices, tablet computers, laptop computers, telephone or other communication devices, personal digital assistants, and the like. Essentially, the data processing system 500 may be any known or later developed data processing system without architectural limitation.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof. No claim element herein is to be construed under the provisions of 35 U.S.C. 112 (f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement the method of terminating a connection between a database server and a database client through an enforcement point, the method comprising:
    continuously monitoring, by the enforcement point, information related to a connection to a database, and parsing one or more queries;
    continuously comparing, by the enforcement point, the information with a predefined plurality of rules to detect a rule violation;
    assembling, by the enforcement point, a termination packet including an error message indicative of the rule violation and a specification of the database, wherein the error message is generated based on the information, wherein the information includes a state of the database, metadata and content of one or more queries from the database client, and one or more responses from the database server, wherein the metadata includes one or more of a database user ID, an internet protocol address of the database client, the timing when a data packet is accessed by the database client, and a format of the data packet;
    sending, by the enforcement point, the termination packet to the database client;
    terminating, by the enforcement point, a connection between the enforcement point and the database client;
    resetting, by the enforcement point, the database server, so that the database server is ready for a new session, wherein the step of resetting the database server further comprises sending one or more dummy payloads to the database server, so as to cancel a current transaction; and
    terminating, by the enforcement point, a connection between the enforcement point and the database server.

2. The method as recited in claim 1, further comprising: storing the information in a session-specific storage.

3. The method as recited in claim 1, wherein the termination packet further includes a header in a particular format related to a type of the database.

4. A computer program product for terminating a connection between a database server and a database client through a database protection solution (DPS) device, the computer program product comprising a computer readable storage medium having program instructions embodied therewith, the program instructions executable by a processor to cause the processor to:
    continuously monitor, by the enforcement point, information related to a connection to a database, and parsing one or more queries;
    continuously compare, by the enforcement point, the information with a predefined plurality of rules to detect a rule violation;
    assemble, by the enforcement point, a termination packet including an error message indicative of the rule violation and a specification of the database, wherein the error message is generated based on the information, wherein the information includes a state of the database, metadata and content of one or more queries from the database client, and one or more responses from the database server, wherein the metadata includes one or more of a database user ID, an internet protocol address of the database client, the timing when a data packet is accessed by the database client, and a format of the data packet;
    send, by the enforcement point, the termination packet to the database client;
    terminate, by the enforcement point, a connection between the enforcement point and the database client;
    reset, by the enforcement point, the database server, so that the database server is ready for a new session, wherein the step of resetting the database server further causes the processor to send one or more dummy payloads to the database server, so as to cancel a current transaction; and
    terminate, by the enforcement point, a connection between the enforcement point and the database server.

5. The computer program product as recited in claim 4, wherein the termination packet further includes a header in a particular format related to a type of the database.

6. A system for terminating a connection between a database server and a database client through a database protection solution (DPS) device, comprising:
    a hardware processor configured to:
        continuously monitor, by an enforcement point, information related to a connection to a database, and parsing one or more queries;

continuously compare, by the enforcement point, the information with a predefined plurality of rules to detect a rule violation;

assemble, by the enforcement point, a termination packet including an error message indicative of the rule violation and a specification of the database, wherein the error message is generated based on the information, wherein the information includes a state of the database, metadata and content of one or more queries from the database client, and one or more responses from the database server, wherein the metadata includes one or more of a database user ID, an internet protocol address of the database client, the timing when a data packet is accessed by the database client, and a format of the data packet;

send, by the enforcement point, the termination packet to the database client;

terminate, by the enforcement point, a connection between the enforcement point and the database client;

reset, by the enforcement point, the database server, so that the database server is ready for a new session, wherein the step of resetting the database server further causes the hardware processor to send one or more dummy payloads to the database server, so as to cancel a current transaction; and terminate, by the enforcement point, a connection between the enforcement point and the database server.

7. The system as recited in claim 6, wherein the enforcement point includes a table access protocol software agent or a reverse proxy.

* * * * *